US010836672B2

(12) United States Patent
Nanjo (10) Patent No.: US 10,836,672 B2
(45) Date of Patent: *Nov. 17, 2020

(54) METHOD FOR MANUFACTURING BENT OPTICAL FIBER (71) Applicant: SUMITOMO ELECTRIC INDUSTRIES, LTD., Osaka-shi, Osaka (JP)

(72) Inventor: Takuya Nanjo, Yokohama (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 290 days.

This patent is subject to a terminal disclaimer.

(21) Appl. No.: 15/962,198

(22) Filed: Apr. 25, 2018

(65) Prior Publication Data

US 2018/0237331 A1 Aug. 23, 2018

Related U.S. Application Data (63) Continuation of application No. PCT/JP2017/024512, filed on Jul. 4, 2017.

(30) Foreign Application Priority Data

Aug. 30, 2016 (JP) ................. 2016-168002

(51) Int. Cl.
*C03B 37/15* (2006.01)
*C03B 37/01* (2006.01)
(Continued)

(52) U.S. Cl.
CPC ........ *C03B 37/15* (2013.01); *B29D 11/00663* (2013.01); *C03B 37/01* (2013.01); *G02B 6/2552* (2013.01)

(58) Field of Classification Search
CPC ... B29D 11/00663; C03B 37/15; C03B 37/01; G02B 6/2552
See application file for complete search history.

(56) References Cited

U.S. PATENT DOCUMENTS 4,276,113 A 6/1981 Carlsen et al.
4,784,456 A 11/1988 Smith
(Continued)

FOREIGN PATENT DOCUMENTS

JP 2004-325622 A 11/2004
JP 2011-85718 A 4/2011
(Continued)

OTHER PUBLICATIONS

Office Action dated Jun. 27, 2019 that issued in U.S. Appl. No. 16/226,746.

(Continued)

*Primary Examiner* — Mathieu D Vargot
(74) *Attorney, Agent, or Firm* — Faegre Drinker Biddle & Reath LLP (57) ABSTRACT

Provided is a method for manufacturing bent optical fibers with which bent optical fibers having a quality difference effectively reduced can be manufactured without a reduction of the manufacturing yield. In the present embodiment, an elastic bending process and a heating process are alternately repeated. In the elastic bending process, a movement restricting member rotatable around a revolving shaft is rotated while an optical fiber having its leading end portion held by the movement restricting member is fed toward the revolving shaft to form bent portions at a part of the optical fiber. In the heating process, the optical fiber is irradiated with a laser beam to relieve stress at the bent portions. Thus,
(Continued)

multiple bent portions at which the stress is relieved are formed in the optical fiber along the longitudinal direction of the optical fiber.

7 Claims, 10 Drawing Sheets

(51) Int. Cl.
*B29D 11/00* (2006.01)
*G02B 6/255* (2006.01)

(56) References Cited

U.S. PATENT DOCUMENTS

| | | |
|---|---|---|
| 6,295,398 B1 | 9/2001 | Gillham et al. |
| 8,014,644 B2 | 9/2011 | Morimoto et al. |
| 2007/0269162 A1 | 11/2007 | Schroll |
| 2011/0058768 A1 | 3/2011 | Swinehart et al. |
| 2011/0198765 A1 | 8/2011 | Sasaki |
| 2015/0336842 A1 | 11/2015 | Kaneuchi et al. |
| 2016/0016843 A1 | 1/2016 | Kaneuchi et al. |

FOREIGN PATENT DOCUMENTS

| | | |
|---|---|---|
| JP | 2012-032725 A | 2/2012 |
| JP | 2012-132972 A | 7/2012 |
| JP | 2015-218090 A | 12/2015 |
| WO | WO-2010/044273 A1 | 4/2010 |
| WO | WO-2012/029157 A1 | 3/2012 |
| WO | WO-2015/076105 A1 | 5/2015 |

OTHER PUBLICATIONS

U.S. Notice of Allowance dated Oct. 31, 2019 that issued in U.S. Appl. No. 16/226,746.

METHOD FOR MANUFACTURING BENT OPTICAL FIBER

CROSS-REFERENCE TO RELATED APPLICATION

This is a continuation application of PCT/JP2017/024512 claiming the benefit of the Japanese Patent Application No. 2016-168002 filed on Aug. 30, 2016, which is incorporated by reference herein in its entirety.

TECHNICAL FIELD

The present invention relates to a method for manufacturing a bent optical fiber having a bent-shaped portion at a part.

BACKGROUND ART

As optical modules become smaller in size, optical fibers installed around the optical modules have been required to have a smaller height (optical fibers having one end perpendicularly connected to an electronic substrate are required to have a low height from the substrate). To reduce the height of an optical fiber, the optical fiber needs to have a bent portion around its leading end. As an example of a technology for forming a bent portion in an optical fiber, JP 2011-85718 A discloses a manufacturing method for forming a bent portion at a part of an optical fiber by continuously heating part of the optical fiber with arc discharge. In this manufacturing method, in order for the bent portion to have an intended radius of curvature, the leading end of the optical fiber is fixed, whereas the other end is pulled with tension. Thus, the bent portion is formed while the optical fiber is being fully strained.

A manufacturing method disclosed in WO 2015/076105 A1 is to form a bent portion in an optical fiber using the weight of a loading member attached to the leading end of the optical fiber. Specifically, the optical fiber having its leading end attached to the loading member and its trailing end fixed is partially irradiated with a laser beam, so that the portion irradiated with a laser beam (portion heated with laser beam irradiation) is softened, and the softened portion is bent by the weight of the loading member.

In a manufacturing method disclosed in WO 2012/029157 A1, an optical fiber having its trailing end fixed and its leading end to which a lever of a revolving jig is fastened is mounted on a manufacturing device, while having a portion located at the center of revolution of the revolving jig. This manufacturing device revolves the revolving jig while continuously heating, by arc discharge, a portion of the optical fiber located at the center of revolution to form a bent portion at the portion (heated portion) of the mounted optical fiber.

SUMMARY OF INVENTION

Technical Problem

The present invention aims to provide a method for manufacturing a bent optical fiber with which bent optical fibers each having a bent-shaped portion with an accurately controlled curvature can be stably manufactured, and with which bent optical fibers having a small quality difference can be effectively manufactured.

Solution to Problem

For manufacturing a bent optical fiber including a core and a cladding, composed of silica glass, and having a bent-shaped portion, a method for manufacturing a bent optical fiber of the present invention includes a preliminary process, a mounting process, and a bent-optical-fiber manufacturing process. The bent-optical-fiber manufacturing process includes an elastic bending process and a heating process. In the preliminary process, a bend imparting mechanism is prepared. The bend imparting mechanism includes a revolving shaft and a movement restricting member, the movement restricting member being rotatable around the revolving shaft while holding an optical fiber to restrict a movement of the optical fiber in a direction perpendicular to a longitudinal direction of the optical fiber. In the mounting process, a first end portion of the optical fiber is mounted on the bend imparting mechanism, and a second end portion of the optical fiber is fixed to a fiber feeding mechanism. The optical fiber is mounted on the bend imparting mechanism by inserting the first end portion of the optical fiber into the movement restricting member from a side of the revolving shaft. In the bent-optical-fiber manufacturing process, multiple bent portions are formed in the optical fiber at a distance from each other in the longitudinal direction so that the optical fiber has the bent-shaped portion.

Here, in the elastic bending process, the fiber feeding mechanism feeds the optical fiber toward the bend imparting mechanism to increase an inclination angle by a predetermined angle and to form the bent portions in the optical fiber, the inclination angle being formed by a feed direction of the optical fiber and a perpendicular line drawn from the movement restricting member to the revolving shaft. In the elastic bending process, the optical fiber is fed concurrently with tilting of the position of the movement restricting member, so that a part of the optical fiber at which the bent portions are to be formed (laser irradiation portion) has its position adjusted to constantly cross the revolving shaft. In the heating process, the bent portions are softened by being heated through scanning of the optical fiber with a laser beam being moved in an axial direction of the revolving shaft across the optical fiber, and thus stress at the bent portions is relieved. In the bent-optical-fiber manufacturing process, the heating process is intermittently repeated while the inclination angle is increased stepwise every time the elastic bending process is performed, to form in the optical fiber the multiple bent portions apart from each other in the longitudinal direction.

In an aspect (1) of the method for manufacturing a bent optical fiber according to the present invention, the optical fiber may be irradiated with the laser beam during a period in which an operation of tilting a position of the movement restricting member and the optical fiber feeding operation of the fiber feeding mechanism are both stopped.

In an aspect (2) of the method for manufacturing a bent optical fiber according to the present invention, a laser-beam-irradiated area may be located on an extension line of a center axis of the revolving shaft, extending in the axial direction, and the laser beam is applied to the optical fiber in the axial direction for scanning the optical fiber across the optical fiber between a first position and a second position, which are located on both sides of the optical fiber across from each other. The first position is a portion of the laser-beam-irradiated area deviating from the optical fiber. The second position is located on one side of the optical fiber across from the first position and is a portion of the irradiated area deviating from the optical fiber.

In an aspect (3) of the method for manufacturing a bent optical fiber according to the present invention, the speed and/or the number of times of the laser-beam scanning in the axial direction may be controlled so that an average temperature (hereinafter referred to as a "fiber temperature") of the laser-beam-irradiated area at which the bent portions of the optical fiber are located is kept at a temperature higher than or equal to a glass softening point for a period of time shorter than or equal to 500 ms. Here, the average temperature represents the average temperature of the irradiated area including gaps.

In an aspect (4) of the method for manufacturing a bent optical fiber according to the present invention, the optical fiber may include multiple optical fiber components arranged side by side in the axial direction. Here, in the mounting process, a first end portion of each of the multiple optical fiber components is held by the movement restricting member. A second end portion of each of the multiple optical fiber components is fixed to the fiber feeding mechanism. The optical fiber or each of the multiple optical fiber components may include one or more cores. Specifically, the method for manufacturing a bent optical fiber according to the present aspect is applicable to a multi-core optical fiber having two or more cores, besides an optical fiber having a single core.

In an aspect (5) of the method for manufacturing a bent optical fiber according to the present invention, the laser beam may include an infrared laser beam having a wavelength of higher than or equal to 1.5 μm.

In an aspect (6) of the method for manufacturing a bent optical fiber according to the present invention, the increased angle by which the inclination angle of the movement restricting member is increased in the elastic bending process every time the heating process is performed may be not greater than 5°.

In an aspect (7) of the method for manufacturing a bent optical fiber according to the present invention, the movement restricting member may be composed of a pair of protrusions, and the pair of protrusions may define a gap having a width within a range of twice an outer diameter of the cladding of the optical fiber or greater to four times the outer diameter or smaller. When the movement restricting member is composed of the pair of protrusions, "the position of the movement restricting member" is defined by a line segment connecting the cross-sectional centers of these protrusions.

Each of the aspects (1) to (7) of the method for manufacturing a bent optical fiber is applicable to the rest of the aspects or all the combinations of the rest of the aspects.

Advantageous Effects of Invention

According to the present invention, while bent portions are formed in the optical fiber, the optical fiber is movable in the longitudinal direction of the optical fiber with respect to the bend imparting mechanism. Thus, the finally obtained bent optical fiber has a smaller risk of breakage. In addition, by forming bent portions apart from each other in the longitudinal directions of each optical fiber, bent optical fibers having a bent-shaped portion with an accurately controlled curvature can be stably obtained (reduction of the yield of the bent optical fibers is prevented). Thus, the quality difference of the manufactured bent optical fibers can be effectively reduced (the quality is stabilized between the bent optical fibers). Here, "the quality difference" of optical fibers means, for a single bent optical fiber, the difference in curvature at the bent portions, and, for a bent optical fiber including multiple optical fiber components, the difference in curvature that defines the bent shape between the obtained multiple bent optical fibers.

DESCRIPTION OF EMBODIMENTS

Specific examples of a method for manufacturing a bent optical fiber according to the present invention are described below in details with reference to the appended drawings. Instead of being limited to these examples, the present invention is defined by the scope of claims, and intended to include equivalents of the scope of claims and all the modifications within the scope. In the description of the drawings, the same components are denoted with the same reference signs and not redundantly described.

After the study of an existing method for manufacturing a bent optical fiber, the inventors have found the following problem. With the manufacturing method disclosed in JP 2011-85718 A, part of an optical fiber is continuously heated by arc discharge to form a bent portion at the heated portion. At this time, the optical fiber is in contact with a supporting member to have an intended curvature at the bent portion, and is thus more likely to be damaged at the contact portion. The optical fiber has its leading end portion fixed (unmovable), and its trailing end portion pulled with a predetermined tension. If pulled with an excessively large tension, the optical fiber would be extended (has its diameter reduced). On the other hand, if pulled with an insufficiently small tension, the optical fiber would sag when it is bent. The present manufacturing method thus needs to determine an optimum tension in consideration of friction.

With the manufacturing method disclosed in WO 2015/076105 A1, a bent portion is formed in an optical fiber using the weight of a loading member attached to the leading end of the optical fiber. This method, however, does not include a specific description on the time for processing an optical fiber. Specifically, this manufacturing method includes bending of an optical fiber during the time when the optical fiber is irradiated with a laser beam, but does not include the description on the specific processing time length. This method is thus more likely to have a large quality difference between manufactured bent optical fibers.

With the manufacturing method disclosed in WO 2012/029157 A1, an optical fiber is continuously heated by arc discharge. In this method, heat is accumulated in not only the heated portion but also in its surroundings. Thus, a portion of the fiber other than a part at which the bent portion is to be formed has its temperature raised, so that the bent portion has its curvature almost uncontrollable (has its curvature uneven).

Figure 1:
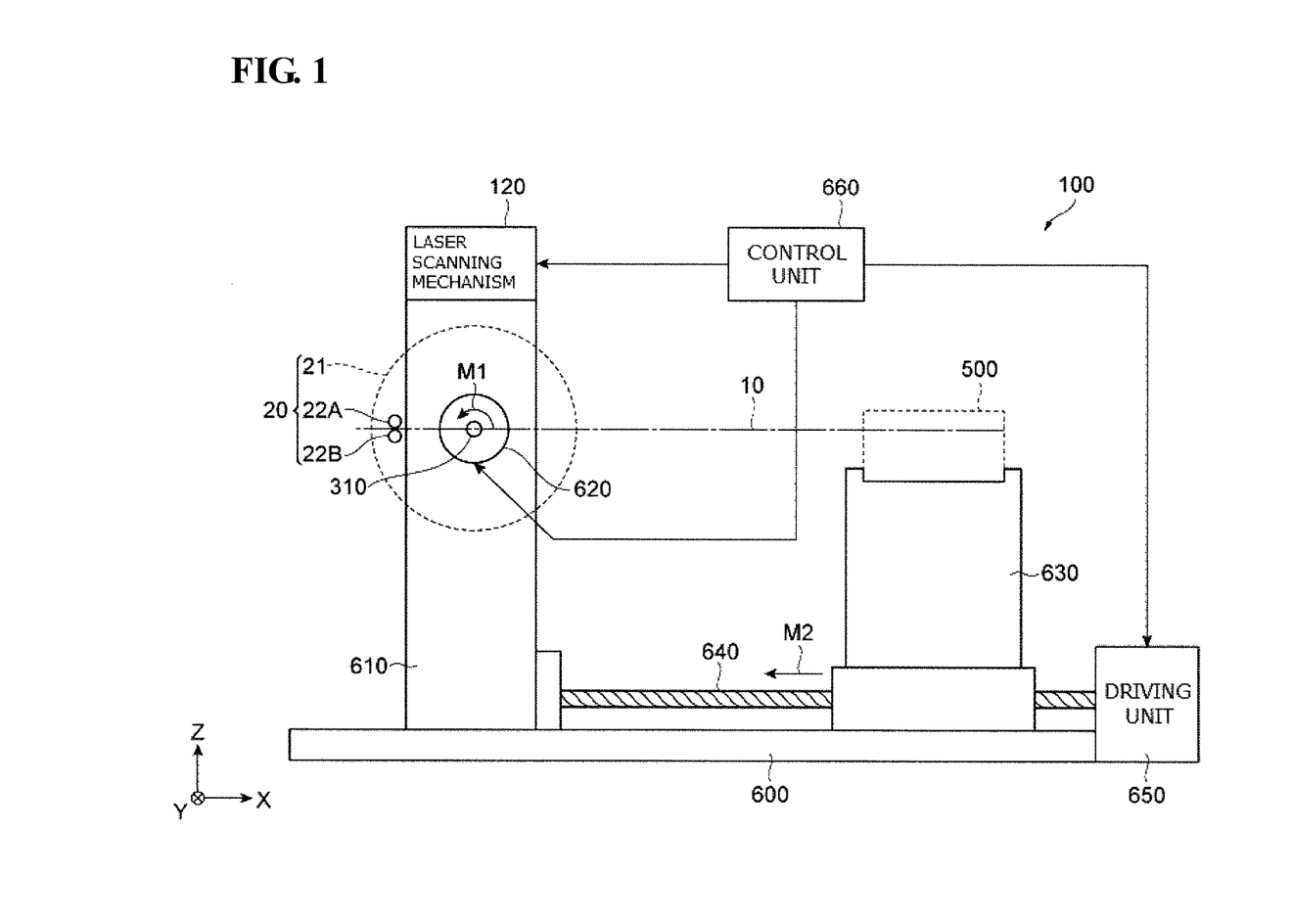
FIG. 1 is a schematic diagram of a configuration example of a manufacturing device that performs a method for manufacturing a bent optical fiber according to the present invention.

FIG. 1 is a schematic diagram of a configuration example of a manufacturing device (manufacturing device 100) for performing a method for manufacturing a bent optical fiber according to the present invention. A manufacturing device 100 includes a control unit 660, a bend forming mechanism for forming a bent portion at a part of an optical fiber 10, a fiber feeding mechanism, and a work stage 600. An X axis is parallel to the optical fiber 10, a Z axis is perpendicular to the work stage 600, and a Y axis is perpendicular to the X axis and the Z axis.

The bend forming mechanism on the work stage 600 includes a bend imparting mechanism 20 for forming a bent portion at a part of the optical fiber 10, a revolving mechanism 620 for revolving the bend imparting mechanism 20, a laser scanning mechanism 120, which scans the optical fiber 10 with a laser beam in the Y axis across the optical fiber 10, and a support table 610, which holds the revolving mechanism 620 and the laser scanning mechanism 120. The revolving mechanism 620 is, for example, a stepping motor, and holds the bend imparting mechanism 20 with a revolving shaft 310 interposed therebetween while being rotatable in the direction indicated with arrow M1. When the bend imparting mechanism 20 is rotated around the revolving shaft 310, the positions of a pair of bending levers 22A and 22B (the position is defined by a line segment connecting the section centers of the paired bending levers 22A and 22B) can be changed.

The fiber feeding mechanism on the work stage 600 includes a fiber holding part 500, a holding stage 630 for holding the fiber holding part 500, a rail 640 that determines the direction in which the holding stage 630 moves (direction indicated with arrow M2), and a driving unit 650 for moving the holding stage 630 along the rail 640. Laser beam irradiation from the laser scanning mechanism 120, an operation of the revolving mechanism 620 for revolving the revolving shaft 310, and an operation of the driving unit 650 for moving the holding stage 630 are collectively controlled by the control unit 660.

Figure 2:
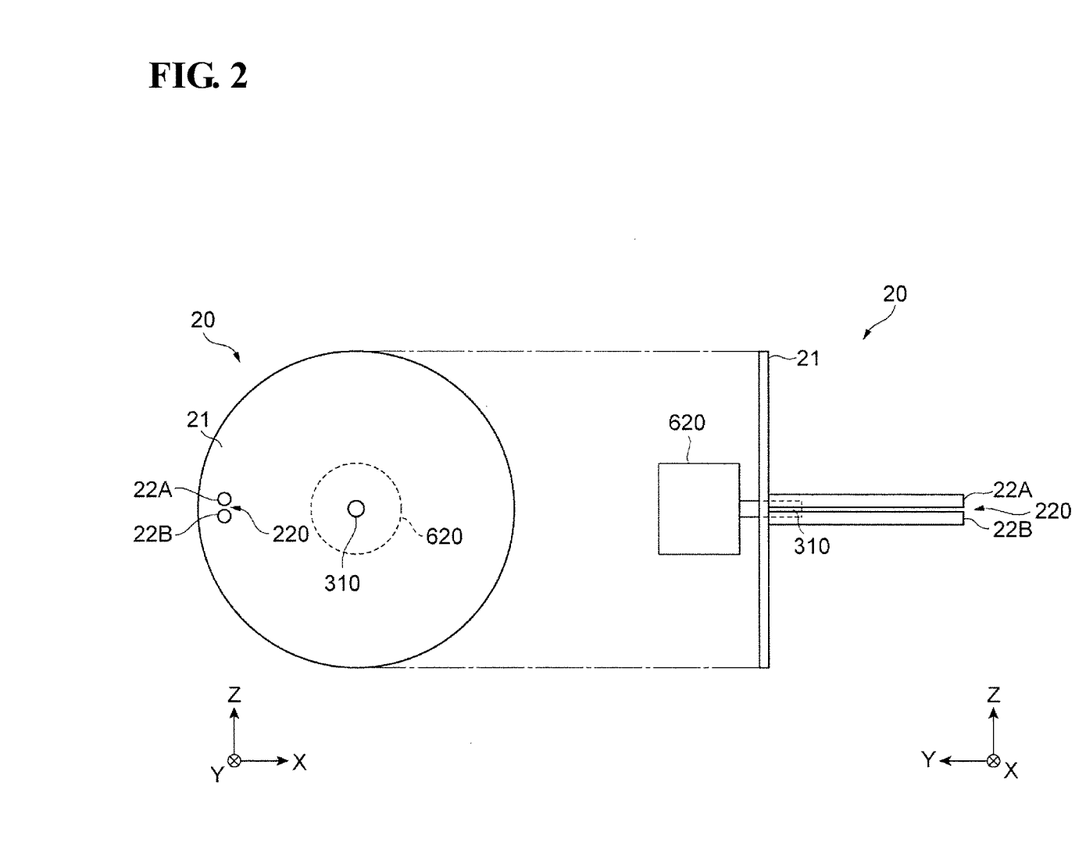
FIG. 2 includes a front view and a side view of a bend imparting mechanism which is a component member of the manufacturing device illustrated in FIG. 1.

The left part of FIG. 2 is a front view (viewed in the Y axis direction) of the bend imparting mechanism 20 which is a component member of the manufacturing device 100, and the right part of FIG. 2 is a side view (viewed in the X axis direction) of the bend imparting mechanism 20. The bend imparting mechanism 20 includes a revolving shaft 310, a disk-shaped supporting plate 21, and a pair of protrusions 22A and 22B. The revolving shaft 310 is attached to the revolving mechanism 620 and extends in the Y axis direction. The disk-shaped supporting plate 21 has its center portion fixed to the revolving shaft 310. The pair of protrusions (component member of a movement restricting member and referred to as "bending levers", below) 22A and 22B are fixed to the main surface of the supporting plate 21 while extending in the axial direction to hold one end portion of the optical fiber 10 between themselves (hereinafter referred to as a "leading end portion"). In the following description, the distance between the revolving shaft 310 and the pair of bending levers 22A and 22B (the positions of the bending levers 22A and 22B on the supporting plate 21 in the radial direction) is denoted with r (see FIG. 5B).

Each of the paired bending levers 22A and 22B extends in the Y axis direction from the main surface of the supporting plate 21. A gap 220 having a predetermined width is interposed between the pair of bending levers 22A and 22B. The optical fiber 10 has its leading end portion extending through the gap 220 so as to have its movement in a direction perpendicular to the longitudinal direction of the optical fiber 10 restricted. When the revolving mechanism 620 revolves the supporting plate 21 with the revolving shaft 310 interposed therebetween, the positions of the pair of bending levers 22A and 22B fixed to the supporting plate 21 are changed, so that the optical fiber 10 has a bent portion at a part.

The width of the gap 220 defined by the pair of bending levers 22A and 22B preferably falls within the range of twice the outer diameter of the cladding of the optical fiber 10 or greater to four times the outer diameter or smaller. Specifically, the width is preferably smaller than or equal to 500 μm. When the width of the gap 220 is determined within the above range, the optical fiber 10 has its movement in the ZX plane in the direction perpendicular to the longitudinal direction of the optical fiber 10 effectively restricted. In addition, before and after the heating process in the process for manufacturing the bent optical fiber, the leading end portion of the optical fiber 10 is prevented from being hooked on the pair of bending levers 22A and 22B, so that the optical fiber 10 can have its leading end portion bent down at an intended angle.

Figure 3:
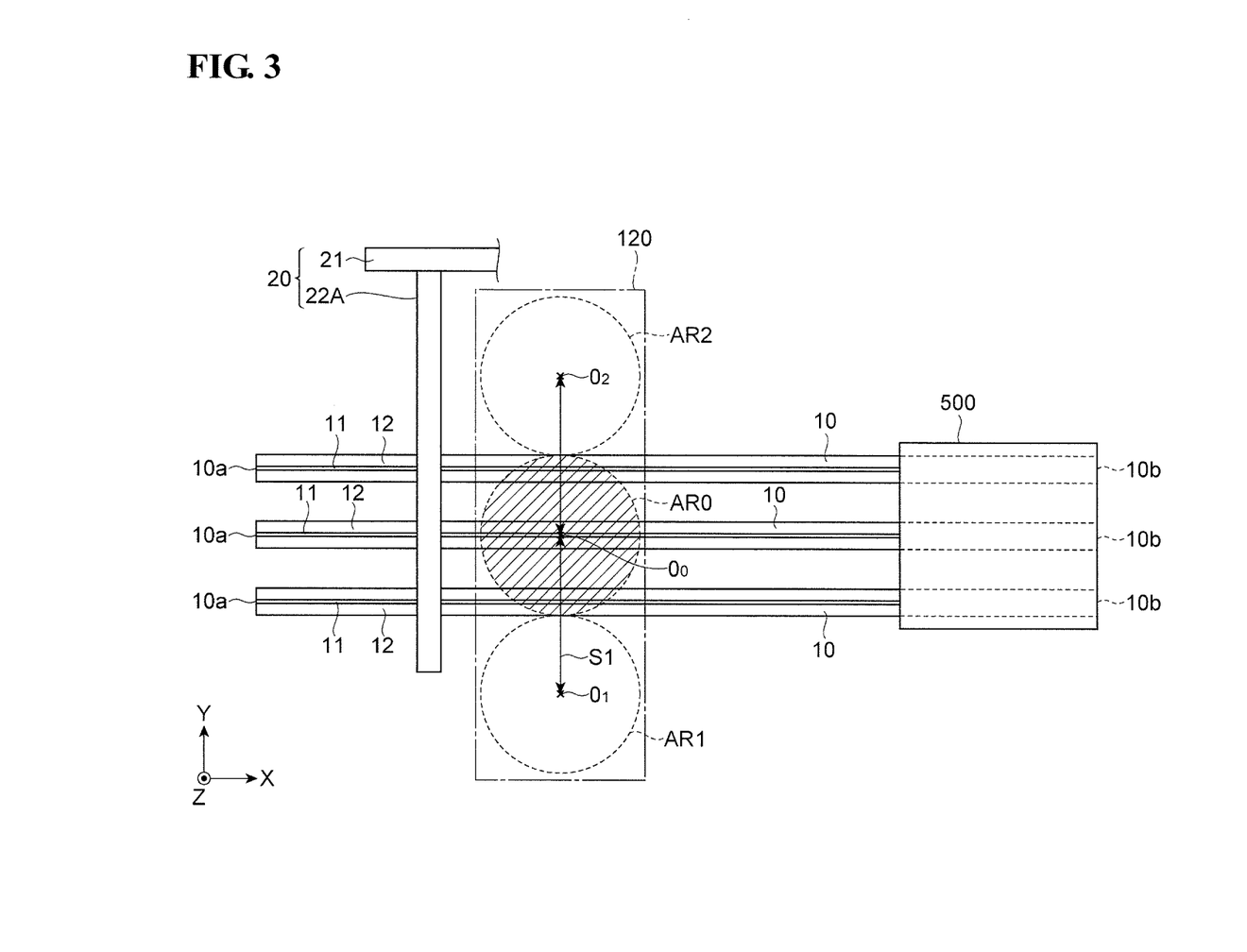
FIG. 3 is a partial plan view of the manufacturing device illustrated in FIG. 1 to which optical fibers are mounted, viewed in a direction in which a laser beam is applied.

FIG. 3 is a partial plan view of the manufacturing device 100 to which the optical fiber 10 is mounted, viewed in the Z axis direction. The prepared optical fiber 10 is composed of silica glass and includes a core 11 and a cladding 12. One optical fiber 10 may be disposed or multiple optical fibers 10 may be arranged side by side. The optical fiber 10 may be a single-core optical fiber including a single core or a multi-core optical fiber including multiple cores. In an area of the optical fiber 10 in which a bent portion is to be formed, the resin coat layer is removed to expose the glass portion of the optical fiber 10. The resin coat layer may be remained over the other area of the optical fiber 10. A connection member such as an optical connector may be disposed at the leading end of the optical fiber 10.

In this example, three optical fibers (optical fiber components) 10 arranged side by side each have its leading end portion, including an end surface 10a, extending through the gap 220, defined by the pair of bending levers 22A and 22B of the bend imparting mechanism 20 (the leading end portion of each optical fiber 10 is held between the pair of bending levers 22A and 22B). Thus, the leading end portions of the optical fibers 10 are mounted on the bend imparting mechanism 20. The other end portion of each optical fiber 10 including an end surface 10b (hereinafter referred to as a "trailing end portion") is fixed to the fiber holding part 500 held on the holding stage 630, so that the trailing end portion of the optical fiber 10 is fixed to a fiber feeding mechanism.

The area irradiated with the laser beam will suffice if it has a size greater than or equivalent to the size of one optical fiber to address an increase or decrease of the number of optical fibers mounted. In the example of FIG. 3, the area irradiated with the laser beam has a size that covers all the three optical fibers 10 arranged side by side in the Y axis direction in an area AR0 (shaded area). However, the area does not have to have a size the covers all the multiple optical fibers. The position of the optical fiber 10 irradiated with the laser beam is adjusted in the fiber feeding operation of the fiber feeding mechanism.

Scanning with the laser beam in the heating process is performed along the Y axis across the three optical fibers 10 between a first position and a second position, deviating from the three optical fibers 10. Specifically, the first position corresponds to a center $O_1$ of a laser-beam-irradiated area AR1, deviating from the three optical fibers 10 in FIG. 3. The second position corresponds to a center $O_2$ of a laser-beam-irradiated area AR2, deviating from the three optical fibers 10 in FIG. 3. Thus, the laser scanning mechanism 120 scans the optical fibers 10 with the laser beam along a two-way arrow S1 in FIG. 3. All the laser-beam-irradiated areas AR0 to AR2 are disposed on the extension line of the center axis of the revolving shaft 310, extending along the Y axis (in the axial direction).

Figure 4:
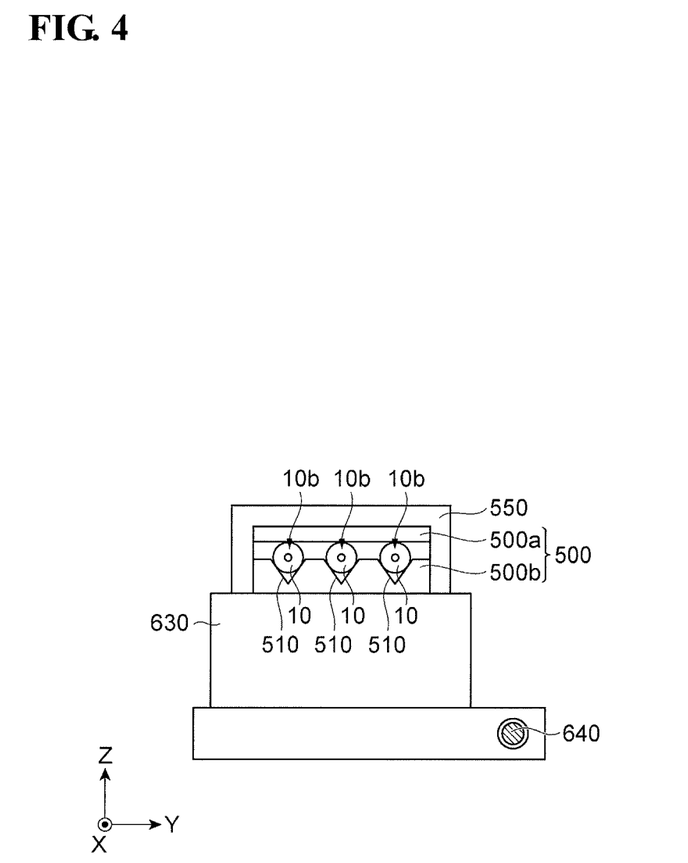
FIG. 4 is a front view of a fiber feeding mechanism which is a component member of the manufacturing device illustrated in FIG. 1, viewed from the bend imparting mechanism.

FIG. 4 is a front view of the fiber feeding mechanism which is a component member of the manufacturing device 100, viewed in the X axis direction. Each optical fiber 10 has its trailing end portion fixed to the fiber feeding mechanism. Specifically, the trailing end portion of the optical fiber 10 is firmly held by the fiber holding part 500 and fixed to a fiber-holding-part feeding mechanism.

The fiber holding part 500 is constituted of a lid 500a and a V-groove plate 500b. The lid 500a restricts the movement of the optical fibers 10 in the Z direction. The V-groove plate 500b has V-shaped grooves 510 that receive the optical fibers 10. The fiber holding part 500 is fixed on top of the holding stage 630 by a fixing jig 550. The rail 640 has a helical thread groove, extending around in the longitudinal direction. A thread ridge is formed on the inner circumferential surface of a through hole of the holding stage 630, through which the rail 640 extends. When the rail 640 is fitted into the through hole of the holding stage 630, the thread groove of the rail 640 is engaged with the thread ridge of the holding stage 630. When the driving unit 650 rotates the rail 640, the holding stage 630 can be moved in at least the direction (X axis direction) indicated with arrow M2 (see FIG. 1).

The method for manufacturing the bent optical fiber according to the embodiment of the present invention is to form a bent-shaped portion at a part of the optical fiber 10 using a laser as a heating source, by intermittently irradiating the optical fiber 10 with a laser beam. Hereinbelow, processes for manufacturing a bent optical fiber according to the present embodiment are described in detail with reference to FIGS. 5A, 5B, and 6 to 9.

Firstly, the optical fibers 10 and the bend imparting mechanism 20 (FIG. 2) are prepared (preliminary process). Subsequently, as illustrated in FIG. 3, the optical fibers 10 are mounted on the manufacturing device 100 (mounting process).

Figure 5A:
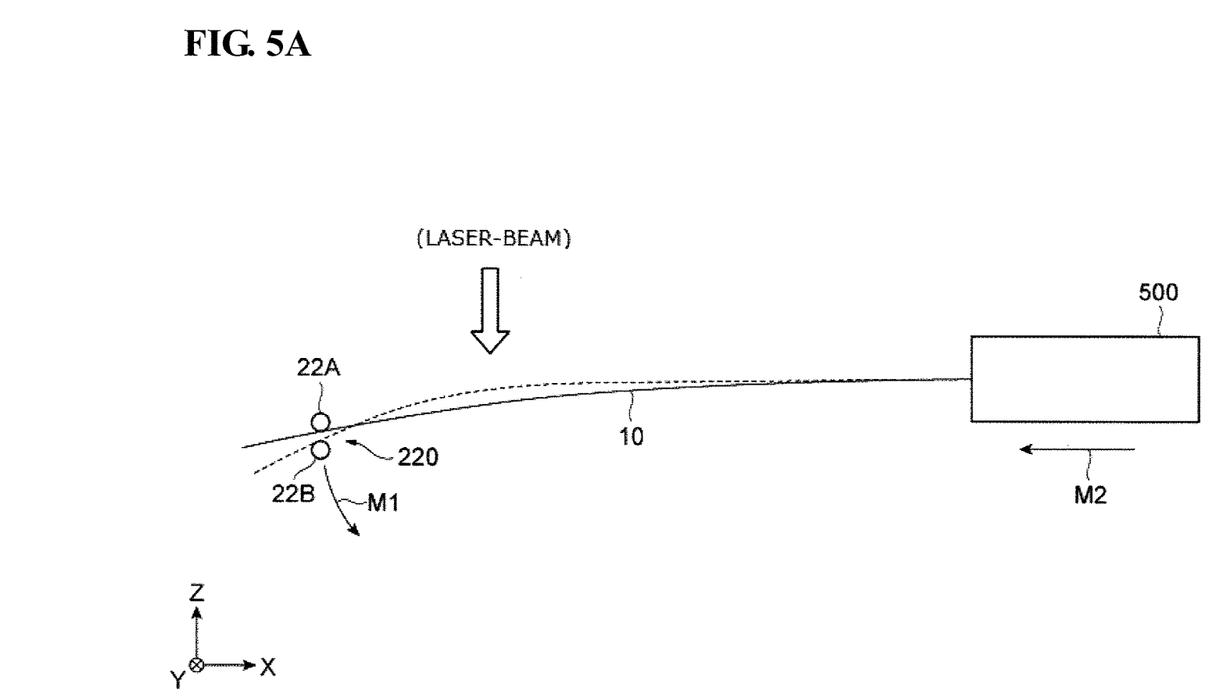
FIG. 5A is a schematic diagram illustrating an example of an elastic bending process and an example of a heating process of the present invention.

In the processes for manufacturing a bent optical fiber, first, an elastic bending process is performed to form a bent portion in each optical fiber 10 mounted on the manufacturing device 100, as indicated with a solid line in FIG. 5A.

Figure 5B:
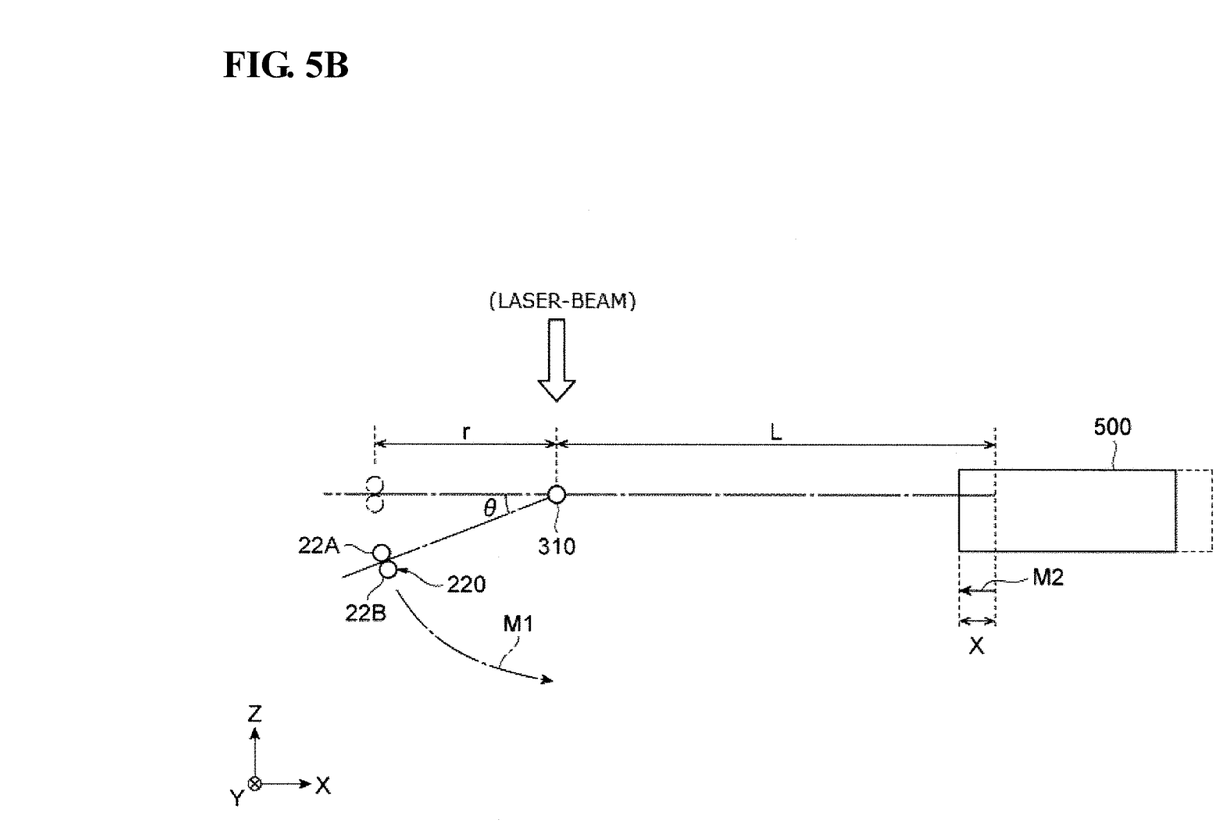
FIG. 5B is a schematic diagram illustrating an example of an optical fiber feeding operation in the elastic bending process of the present invention.

FIG. 5B illustrates positioning of each portion shown in FIG. 5A. Specifically, in FIG. 5B, the distance between the revolving shaft 310 and the pair of bending levers 22A and 22B (radius of gyration) r is defined by the distance from the cross-sectional center of the revolving shaft 310 to the middle position between the cross-sectional centers of the pair of bending levers 22A and 22B. The distance between the cross-sectional center of the revolving shaft 310 and the end surface (end surface closer to the bend imparting mechanism 20) of the fiber holding part 500 is L.

In the elastic bending process, the control unit 660 controls the revolving mechanism 620 to rotate the revolving shaft 310 so that the positions of the pair of bending levers 22A and 22B are tilted by an angle θ (preferably smaller than or equal to 5°) with respect to a fiber feed direction (X axis direction in FIG. 1). Concurrently, the control unit 660 controls the driving unit 650 to move the holding stage 630 a predetermined distance x in the direction indicated with arrow M2 along the rail 640. This movement of the holding stage 630 changes the distance between the cross-sectional center of the revolving shaft 310 and the end surface of the fiber holding part 500 to (L-x).

For an inclination angle between the movement direction M2 and a perpendicular line drawn from the pair of bending levers 22A and 22B to the revolving shaft to be at an angle θ, the positions of the pair of bending levers 22A and 22B move along arrow M1 (in the rotation direction of the revolving shaft 310) around the revolving shaft 310. Thus, the optical fiber 10 has a bent portion. Here, only tilting the positions of the pair of bending levers 22A and 22B would cause the bent portion of each optical fiber 10 to deviate downward from the extension line (virtual line parallel to the Y axis) of the center axis of the revolving shaft 310 on which the laser-beam-irradiated areas AR0 to AR2 are disposed. In the present embodiment, moving the fiber holding part 500, to which the trailing end portion of the optical fiber 10 is fixed, by the distance x toward the bend imparting mechanism 20 allows the bent portion of the optical fiber 10 to be positioned on the extension line of the center axis of the revolving shaft 310. This feeding operation of the optical fiber 10 can shift the position at which the bent portion is to be formed (that is, the position irradiated with the laser beam) in the longitudinal direction of the optical fiber 10.

In the heating process following the elastic bending process, as illustrated in FIG. 3, a laser beam covering the irradiated area AR0 is moved in the direction indicated with arrows S1 to perform scanning between the irradiated areas AR1 and AR2 to heat the bent portions formed in the optical fibers 10 in the elastic bending process. The irradiated laser beam is an infrared laser beam having a wavelength of higher than or equal to 1.5 μm. The laser-beam-irradiated area is determined on the extension line (virtual line) of the center axis of the revolving shaft 310 extending in the Y axis (axial direction), that is, on the rotation center of the bend imparting mechanism 20. To prevent the positional change of the bent portion formed in each optical fiber 10 in the elastic bending process (change of the distance by which the laser beam travels to irradiate the optical fiber 10), the heating process is performed during the period while the bend imparting mechanism 20 (operation of moving the pair of bending levers 22A and 22B) and the feed mechanism (operation of moving the holding stage 630) are stopped.

Figure 7:
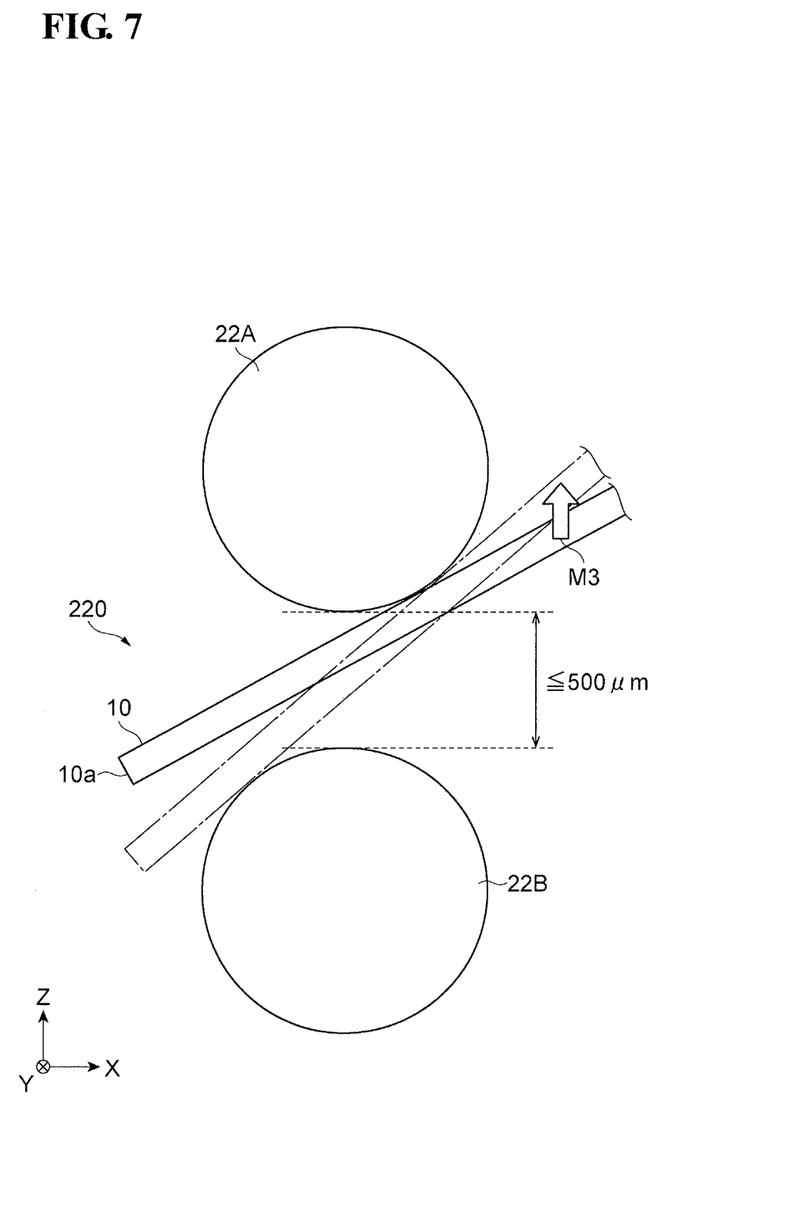
FIG. 7 is a schematic diagram illustrating an example of a positional change of an end portion of an optical fiber before and after the heating process of the present invention.

The laser-beam irradiation operation relaxes the stress at the bent portion of the optical fiber 10, and changes the shape of the optical fiber 10 to the shape drawn with the broken line in FIG. 5A. FIG. 7 illustrates the change in shape of the optical fiber 10 (leading end portion of the optical fiber 10) near the pair of bending levers 22A and 22B at this time. Specifically, as illustrated in FIG. 7, before the optical fiber 10 is heated in the laser beam scanning, the bending lever 22A restricts the movement of the leading end portion (portion drawn with solid line in FIG. 7) of the optical fiber 10 pressed against the bending lever 22A. After the optical fiber 10 is heated, the leading end portion of the optical fiber 10 is moved to the position drawn with the broken line in FIG. 7, as a result of the stress at the bent portion of the optical fiber 10 being relieved. Here, the bending lever 22A prevents a portion of the optical fiber 10 closer to the heated portion than is the bend imparting mechanism 20 from springing up in the direction indicated with arrow M3 in FIG. 7, and the bending lever 22B prevents a portion of the optical fiber 10 closer to the end surface 10a from moving down in the direction opposite to arrow M3.

As illustrated in FIG. 3, the laser-beam scanning is performed in the direction indicated with arrows S1 (corresponding to the Y axis direction crossing the three optical fibers 10) between the irradiated area AR1 specified by the center $O_1$ (first position) and the irradiated area AR2 specified by the center $O_2$ (second position). Both of the irradiated areas AR1 and AR2 deviate from the three optical fibers 10 for reducing the effect of the beam profile.

Figure 6:
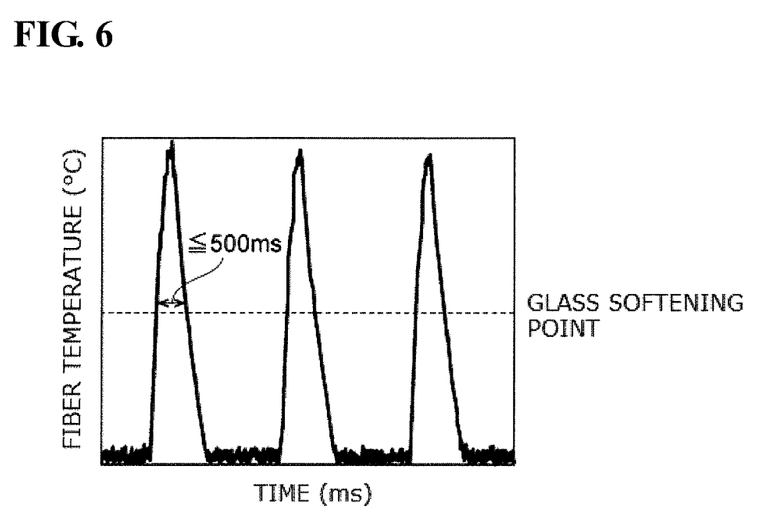
FIG. 6 illustrates a heating process of the present embodiment together with FIG. 3.

To prevent an excessive irradiation from excessively softening the optical fiber 10 and bending the optical fiber 10 by its weight to a greater degree than intended, the irradiation time is determined on the basis of the measurement result of the temperature in the laser-beam-irradiated area. For example, FIG. 6 is a graph showing the change of the fiber temperature over time (the average temperature of the laser-beam-irradiated area in which the bent portion of the optical fiber 10 is disposed), and the measurement results of intermittent reciprocation of a laser beam multiple times between the irradiated area AR1 and the irradiated area AR2. In the present embodiment, the control unit 660 controls the laser scanning mechanism 120 so that the surface temperature of each optical fiber 10 is kept at the temperature higher than or equal to the glass softening point for a period of time shorter than or equal to 500 ms.

The surface temperature of the optical fiber 10 is measured using a pyrometer. Preferably, the pyrometer has a high response speed on the order of milliseconds, to record a sudden temperature change in a short period in response to the laser beam irradiation. A temperature measurement range over which the temperature is measured is determined to be the range that exactly covers the width of the optical fibers (the three optical fibers 10 arranged side by side in the present embodiment), and the measured temperature is determined to be the average temperature of the range. The measured temperature is the average temperature of the area including the gaps between the three optical fibers 10, and may be different from the surface temperature of the actual optical fibers. Thus, the glass softening point according to the present embodiment represents the actual temperature measured by the pyrometer when the optical fiber 10 starts being softened.

As described above, the stress resulting from the "operation of the bend imparting mechanism 20 for bending down the leading end portion of the optical fiber 10" and the "operation of the fiber feeding mechanism for moving the trailing end of the optical fiber 10 forward" in the elastic bending process is relaxed by the laser-beam scanning (softening of the bent portion of the optical fiber 10 with heating) in the heating process. Thus, the bent portion of the optical fiber 10 moves slightly upward (shape drawn with the broken line in FIG. 5A), so that the bending operation to the bent optical fiber 10 by an angle corresponding to the degree by which the optical fiber is bent down can be complete.

Figure 8:
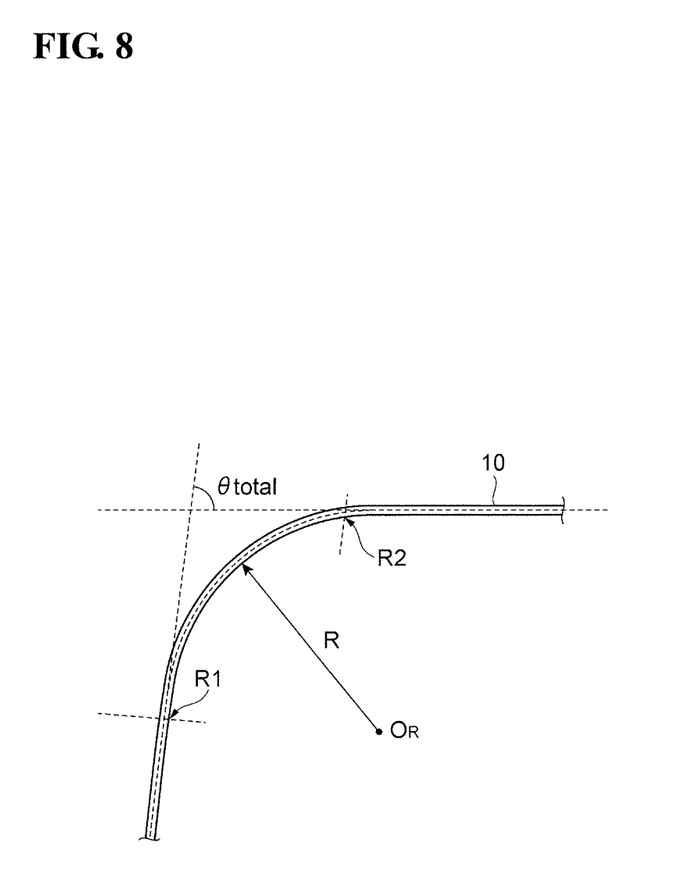
FIG. 8 is an enlarged diagram of a bent-shaped portion of a bent optical fiber manufactured with a manufacturing method according to an embodiment of the present invention.

In the bent-optical-fiber manufacturing process according to the present embodiment, the above-described elastic bending process and heating process are repeated until the optical fibers have an intended bent shape. FIG. 8 is an enlarged view of the bent-shaped portion of a bent optical fiber manufactured by the manufacturing method according to the present embodiment. The bent optical fiber 10 has a radius of curvature R. A bending angle $\theta_{total}$ at the bent-shaped portion is defined by an angle between a straight portion extending from a beginning R1 to the leading end portion of the bent optical fiber 10 including the end surface 10a and a straight portion extending from an end R2 to the trailing end portion of the bent optical fiber 10 including the end surface 10b. When the above-described elastic bending process and heating process are performed n ($\geq 1$) times, the bending angle $\theta_{total}$ corresponds to n$\theta$ (bending angle $\theta$ is smaller than or equal to 5° in one operation). The bent optical fiber 10 was not found to have laser beam irradiation marks, breakage, or thinned portions.

Figure 9:
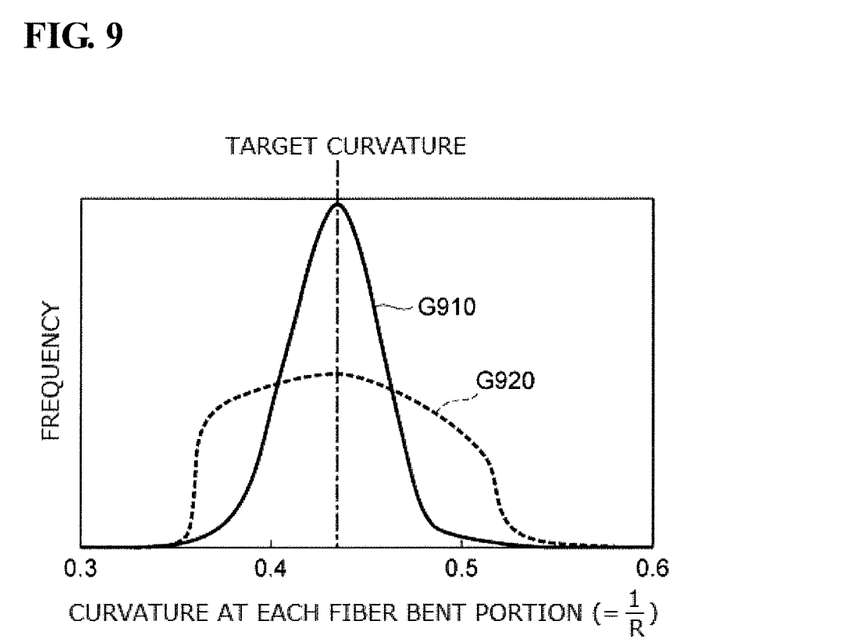
FIG. 9 illustrates measurement results of the curvature (=1/radius of curvature R) of a bent-shaped portion of the bent optical fiber manufactured with a manufacturing method according to an embodiment of the present invention and a bent-shaped portion of a bent optical fiber manufactured with a manufacturing method according to a comparative example.

FIG. 9 is a graph showing the measurement results of the frequency to the curvature (=1/radius of curvature R) at n bent portions in the bent-shaped portion (in the range from the beginning R1 to the end R2) of each of m bent optical fibers. A curve G910 represents the measurement results for the bent optical fiber manufactured by the manufacturing method according to the present embodiment. A curve G920 represents the measurement results for a bent optical fiber according to a comparative example. The bent optical fiber according to the comparative example is manufactured by the manufacturing method disclosed in JP 2011-85718 A. The horizontal axis "the curvature (=1/R) at each point of m fibers having n bent portions" in FIG. 9 corresponds to the curvature at each point in the bent-shaped portion (the range from the beginning R1 to the end R2) of the bent optical fiber 10 illustrated in FIG. 8.

In order to manufacture multiple bent optical fibers having stable curvatures with the method for manufacturing the bent optical fibers including continuous heating described in JP 2011-85718 A, the temperature is required to be uniformly distributed in both the longitudinal direction and the width direction in which the multiple optical fibers to have bent portions are arranged. Even when the temperature is uniformly distributed in two directions, heat is more likely to concentrate at the centers of the respective optical fibers during the continuous heating. As illustrated in FIG. 9, stably controlling the curvature of the bent-shaped portion of each optical fiber is difficult (graph G920). On the other hand, with the manufacturing method according to the present embodiment (intermittent bending with laser beam irradiation), the temperature of the optical fiber to have a bent portion can be accurately managed by controlling the laser beam output conditions. Thus, as illustrated in the graph in FIG. 9, the manufacturing method can achieve a stable curvature (graph G910).

According to the present invention, multiple optical fibers arranged on the same plane to be collectively handled, as in the present embodiment, are fixed in position by the fiber feeding mechanism to which the multiple optical fibers are mounted before being subjected to the bending operation. Thus, the obtained multiple bent optical fibers have a small quality difference. The position adjustment of the bend imparting mechanism with respect to the multiple optical fibers or the mounting of the multiple optical fibers are facilitated. The fiber feeding mechanism contributes to fixing of the bent optical fiber in the longitudinal direction, and the bend imparting mechanism contributes to fixing of the bent optical fiber in the direction of the radius of curvature. The fiber feeding mechanism operates so as to reduce a change of the distance by which the laser beam travels to a bent portion that is to be formed in an optical fiber before being heated.

The invention claimed is:

1. A method for manufacturing a bent optical fiber including a core and a cladding, composed of silica glass, and having a bent-shaped portion, the method comprising:
   a preliminary process of preparing a bend imparting mechanism that includes a revolving shaft and a movement restricting member, the movement restricting member comprising a pair of protrusions, the pair of protrusions define a gap having a width within a range of twice an outer diameter of the cladding of the optical fiber or greater to four times the outer diameter or smaller, and the movement restricting member being rotatable around the revolving shaft while holding an optical fiber to restrict a movement of the optical fiber in a direction perpendicular to a longitudinal direction of the optical fiber;
   a mounting process of inserting a first end portion of the optical fiber into the movement restricting member from a side of the revolving shaft to mount the first end portion of the optical fiber on the bend imparting mechanism, and fixing a second end portion of the optical fiber to a fiber feeding mechanism; and
   a bent-optical-fiber manufacturing process of forming, in the optical fiber, a plurality of bent portions apart from each other in the longitudinal direction so that the optical fiber has the bent-shaped portion,
   wherein the bent-optical-fiber manufacturing process includes
      an elastic bending process of the fiber feeding mechanism feeding the optical fiber toward the bend imparting mechanism to increase an inclination angle by a predetermined angle, and to form the bent portions at a part of the optical fiber having a position so adjusted as to cross the revolving shaft, the inclination angle being formed by a feed direction of the optical fiber and a perpendicular line drawn from the movement restricting member to the revolving shaft, and
      a heating process of softening the bent portions by heating the bent portions through scanning of the optical fiber with a laser beam being moved in an axial direction of the revolving shaft across the optical fiber, and thus relieving stress at the bent portions, and
   wherein the heating process is intermittently repeated while the inclination angle is increased stepwise every time the elastic bending process is performed, to form, in the optical fiber, the plurality of bent portions apart from each other in the longitudinal direction.

2. The method for manufacturing a bent optical fiber according to claim 1, wherein the optical fiber is irradiated with the laser beam during a period in which an operation of tilting a position of the movement restricting member and an operation of feeding the optical fiber from the fiber feeding mechanism are both stopped.

3. The method for manufacturing a bent optical fiber according to claim 1, wherein the laser beam is applied to the optical fiber in the axial direction to scan the optical fiber across the optical fiber between a first position, at which a laser-beam-irradiated area deviates from the optical fiber, and a second position, which is located on one side of the optical fiber across from the first position and at which the irradiated area deviates from the optical fiber.

4. The method for manufacturing a bent optical fiber according to claim 1, wherein the laser-beam scanning in the axial direction is controlled so that an average temperature of the laser-beam-irradiated area at which the bent portions of the optical fiber are located is kept at a temperature higher than or equal to a glass softening point for a period of time shorter than or equal to 500 ms.

5. The method for manufacturing a bent optical fiber according to claim 1,
   wherein the optical fiber includes a plurality of optical fiber components arranged side by side in the axial direction, and
   wherein, in the mounting process, a first end portion of each of the plurality of optical fiber components is held by the movement restricting member, and a second end portion of each of the plurality of optical fiber components are fixed to the fiber feeding mechanism.

6. The method for manufacturing a bent optical fiber according to claim 1, wherein the laser beam includes an infrared laser beam having a wavelength of higher than or equal to 1.5 µm.

7. The method for manufacturing a bent optical fiber according to claim 1, wherein the increased angle by which the inclination angle of the movement restricting member is increased in the elastic bending process every time the heating process is performed is smaller than or equal to 5°.

* * * * *